Sept. 21, 1937.  A. E. BOWEN  2,093,512

ELECTRICAL MEASURING SYSTEM

Filed Aug. 25, 1936

INVENTOR
A. E. Bowen
BY
ATTORNEY

Patented Sept. 21, 1937

2,093,512

UNITED STATES PATENT OFFICE 2,093,512

ELECTRICAL MEASURING SYSTEM

Arnold Everett Bowen, Red Bank, N. J., assignor to American Telephone and Telegraph Company, a corporation of New York Application August 25, 1936, Serial No. 97,846

5 Claims. (Cl. 175—183)

This invention relates to electrical measuring and testing systems. More particularly, this invention relates to means for and methods of determining the characteristics of a sinusoidally alternating voltage.

One object of the invention is to provide a method and means for determining the magnitude of a sinusoidally alternating voltage.

Another object of this invention is the provision of a method and means for determining the phase of a sinusoidally alternating voltage.

Still another object of this invention is the provision of a method and means for determining both the magnitude and phase of any sinusoidally alternating voltage.

Figure 1:
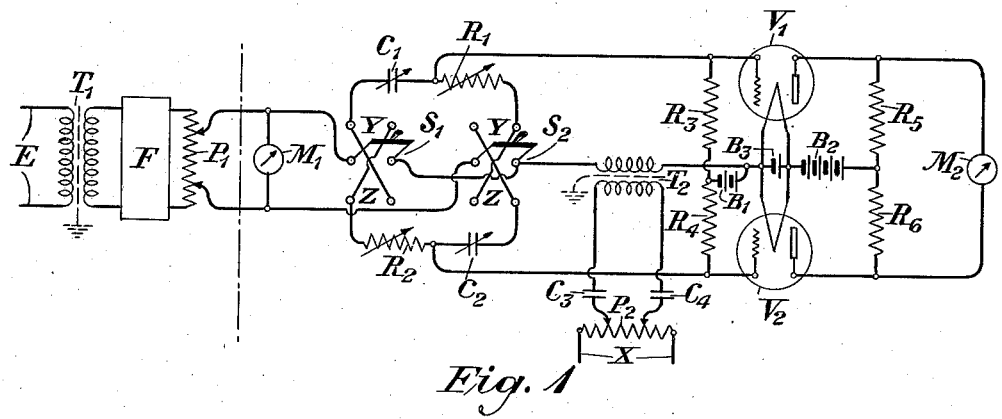
Figure 2:
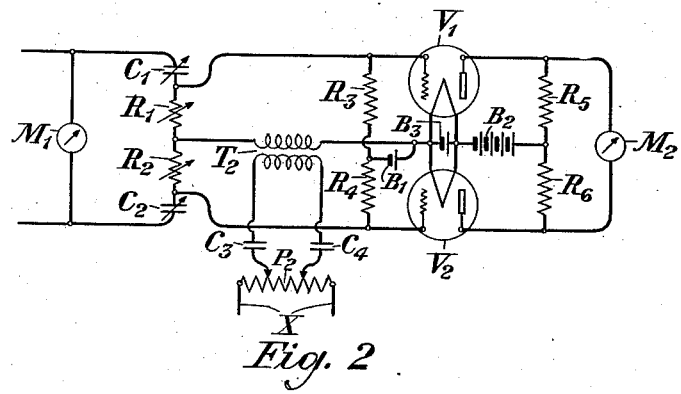
Figure 3:
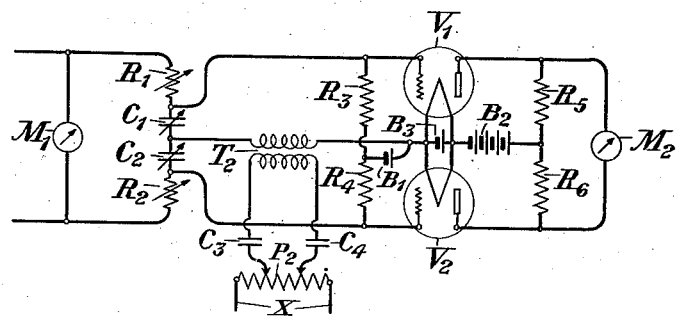

While the nature of this invention will be pointed out with particularlity in the appended claims, the invention itself, both as to its objects and features, will be better understood from the detailed description hereinafter following when read in connection with the accompanying drawing in which Figure 1 represents one embodiment of the invention suitable for analyzing the magnitude and phase of an alternating voltage, and Figs. 2 and 3 represent modifications of part of the apparatus illustrated in Fig. 1.

The general arrangement of the apparatus for determining both the magnitude and phase of a voltage which it is desired to measure is illustrated in Fig. 1. At the terminals E of the primary winding of a transformer $T_1$, a voltage having the same frequency as that which it is desired to measure is applied. If a multifrequency generator (not shown) is connected at the terminals E, any desired frequency of the generator may be selected and applied to the primary winding of the transformer $T_1$. The secondary winding of the transformer $T_1$ is connected to a filter F which serves the purpose of eliminating from the voltage wave all frequencies except the desired frequency, namely, the fundamental. The filter F is in turn connected to a potentiometer $P_1$, which is employed to adjust the voltage derived from the output of the filter F for application to a voltmeter designated $M_1$. The voltmeter $M_1$ is connected to double-pole, double-throw reversing switches $S_1$ and $S_2$ through which the circuit may be completed through condensers $C_1$ and $C_2$ and resistors $R_1$ and $R_2$. The function of this part of the circuit will be described hereinafter.

From this assemblage voltages are derived which are applied to the grids of two vacuum tubes $V_1$ and $V_2$, which are arranged in balanced or push-pull relationship. The grids of these tubes are connected respectively to their filaments through substantially equal leak resistors $R_3$ and $R_4$, respectively, and through a common biasing battery $B_1$. In the plate circuits of these tubes approximately equal resistors $R_5$ and $R_6$ are connected as shown through which plate current is supplied by a battery $B_2$. A battery $B_3$ is common to and in parallel with the filaments of both tubes $V_1$ and $V_2$. The plates of the two tubes are also connected to a sensitive direct current galvanometer designated $M_2$, as shown.

The terminals X lead to a source of alternating voltage which may be of some predetermined frequency, or of the selected component of a complex wave, the magnitude and phase of which are unknown when considered with respect to the corresponding characteristics of the voltage applied to terminals E. The terminals X lead to the outermost poles of a potentiometer $P_2$ the sliding contacts of which are connected through a pair of equal condensers $C_3$ and $C_4$ to the primary winding of a transformer $T_2$. The secondary winding of the transformer $T_2$ is connected in common with the grid circuits of both vacuum tubes $V_1$ and $V_2$.

Briefly, the arrangement illustrated in Fig. 1 operates as follows: A voltage of the frequency of the voltage which it is desired to measure is applied to terminals E and is transmitted through transformer $T_1$ and through filter F to the potentiometer $P_1$, which is adjusted until a suitable reading is obtained on the voltmeter $M_1$. The condensers $C_1$ and $C_2$ are made equal and the resistors $R_1$ and $R_2$ are adjusted until the resistance of $R_1$ (and that of $R_2$) is equal to $$\frac{1}{\omega C_1}$$

where $\omega=2\pi f$, $f$ being the frequency. In a practical instrument, $C_1$ and $C_2$ may be equal fixed condensers, if desired, $R_1$ and $R_2$ being adjustable; or conversely. The switches $S_1$ and $S_2$ are then thrown upwardly, that is, to positions Y, setting up the circuit shown in Fig. 2 of the drawing, Fig. 2 illustrating that part of the circuit of Fig. 1 which is to the right of the dot and dash line.

There are thus applied in the grid circuits of the two vacuum tubes $V_1$ and $V_2$ equal voltages of known magnitude, say $E_R$. If the vacuum tubes have identical characteristics and the other circuit elements of these tubes are also balanced, the microammeter $M_2$ will not be deflected. Small differences in the characteristics of the tubes can be compensated for by means not shown, as, for instance, by making either $R_5$ or $R_6$ adjustable in value.

Now connect the voltage which it is desired to measure to the terminals X and let this voltage be $E_O$. Adjust the potentiometer $P_2$ until a convenient deflection is obtained at the microammeter $M_2$. Then, if the tubes are working on the square law parts of their characteristic curves of operation, the deflection $d_R$ of the meter $M_2$ will be proportional to the product $E_R E_O \cos \theta$, where $\theta$ is the phase angle between voltages $E_R$ and $E_O$. Expressed as an equation, this is $$d_R = K E_R E_O \cos \theta \qquad (1)$$

In this equation K is a constant of proportionality which depends upon the setting of the potentiometer $P_2$ and the characteristics of the transformer $T_2$ as well as the characteristics of the tubes $V_1$ and $V_2$.

Now suppose that switches $S_1$ and $S_2$ are thrown downwardly, that is, to positions Z. In this case the circuit to the right of the dot and dash line of Fig. 1 will be that shown in Fig. 3. The only change in the circuit from that of Fig. 2 is that the voltage impressed on the grids of the two tubes $V_1$ and $V_2$ is now the potential drops across the condensers $C_1$ and $C_2$, respectively, instead of the potential drops across the resistors $R_1$ and $R_2$, respectively. Since the condensers $C_1$ and $C_2$ are in series, respectively, with the resistors $R_1$ and $R_2$, the potential drops across them are in quadrature, that is, $$E_C = E_R \underline{/-90°}$$

when expressed vectorially. If the corresponding deflection of the meter $M_2$ is $d_C$, the equation can be written $$d_C = K E_C E_O \cos(\theta - 90°) \qquad (2)$$

$$d_C = K E_R E_O \sin \theta \qquad (3)$$

From these equations we get $$E_O = \frac{1}{K E_R}\sqrt{d_C^2 + d_R^2} \qquad (4)$$

$$\theta = \arctan \frac{d_C}{d_R} \qquad (5)$$

The constant K of these equations may be determined from the measurement of some known voltage. If the voltage $E_R$ applied to the grids of the two tubes $V_1$ and $V_2$ is unknown, the product $K E_R$ may be determined by measurement of a known voltage, as, for instance, the voltage across the terminals of meter $M_1$.

An alternative mode of operation is as follows: Apply a voltage to terminals E and adjust the potentiometer $P_1$ until the voltmeter $M_1$ indicates a suitable magnitude. Adjust the condensers $C_1$ and $C_2$ and resistors $R_1$ and $R_2$ until each resistance equals $$\frac{1}{\omega C_1}$$

as before. Throw switches $S_1$ and $S_2$ to the upward positions Y. Then connect the voltage $E_O$ which it is desired to measure to the terminals X. Adjust the potentiometer $P_2$ until an arbitrarily fixed deflection $d$ of the meter $M_2$ is reached. Let $f_R$ represent the fractional part of the potentiometer $P_2$ required to obtain this deflection $d$ of the meter $M_2$. Then throw switches $S_1$ and $S_2$ to the lower positions Z. Adjust the potentiometer $P_2$ to a new setting $f_C$ such that the meter $M_2$ now reaches the same deflection $d$. Then the required magnitude and phase displacement of the voltage $E_O$ with respect to the voltage of the same frequency applied to terminals E may be found from the following relations:

$$E_O = \frac{d}{K E_R} \frac{\sqrt{f_R^2 + f_C^2}}{f_C f_R} \qquad (6)$$

$$\theta = \arctan \frac{f_R}{f_C} \qquad (7)$$

The constant of the apparatus $$\frac{d}{K E_R}$$

may be determined by measurement from a known voltage.

The successful practice of either of the methods described hereinabove requires that the input impedance of the transformer $T_2$ be large when compared with the total resistance of the potentiometer $P_2$.

If the source X has more than one frequency component, the same apparatus may be used to determine both the magnitude and phase of each of its other component frequencies. To measure any selected frequency component of the voltage applied to the terminals X, a corresponding known voltage of the same frequency will be applied to the terminals E, and the methods of operation described hereinabove will be repeated.

It is again noted that the operation of the instrument requires that the voltage applied to E has the same frequency as the voltage to be measured. If the voltage to be measured is complex, deflection of $M_2$ will be obtained only when frequency of E is the same as that of one of the components, and deflection of $M_2$ will then depend only on the amplitude and phase of this component, and will be unaffected by the presence of other components. Thus, to measure all components of a complex E. M. F., one merely connects the complex E. M. F. to terminals X and adjusts the frequency of source E to be successively equal to those of the components of the complex wave and proceeds as described previously with respect to each component.

The resistors $R_3$ and $R_4$ are of large magnitude and, in association with biasing battery $B_1$, cause the tubes $V_1$ and $V_2$ to operate as rectifiers of impressed alternating voltages. The voltages applied by resistors $R_5$ and $R_6$ to the meter $M_2$, which effectively deflect the pointer of that meter, are direct voltages poled in mutual opposition. In other words, the meter $M_2$ merely indicates the difference in the direct current voltages applied across resistors $R_5$ and $R_6$.

While this invention has been shown and described in certain particular arrangements merely for the purpose of illustration, it will be clearly understood that the general principles of this invention may be applied to other and widely varied organizations without departing from the spirit of the invention and the scope of the appended claims.

What is claimed is:

1. An apparatus for the measurement of the magnitude and phase of an alternating voltage, comprising two rectifying vacuum tubes arranged in push-pull relationship, a potentiometer across which the unknown alternating voltage is applied, means for applying the voltage across the potentiometer to the input circuits of both vacuum tubes, a meter connected to the output circuits of both vacuum tubes for indicating the difference in voltages present in the output circuits of both vacuum tubes, two equal condensers, two equal resistors each connected in series with one of the condensers and associated with one of the vacuum tubes, a known source of voltage of the same frequency as the unknown voltage and connected effectively in series with both condensers and both resistors, and means for applying the voltage across the resistors to the input circuits of the vacuum tubes and later applying the voltage across the condensers to the input circuits of both vacuum tubes, respectively.

2. An apparatus for comparing the magnitude and phase of an unknown voltage with the corresponding characteristics of a known voltage of the same frequency, comprising two equal condensers, two equal resistors each connected in series with one of the condensers, the known source being connected in series with both condensers and both resistors, two equal rectifiers arranged in push-pull relationship, a meter for indicating differences in the currents flowing through both rectifying devices, means for connecting the resistors to the input circuits of the rectifying devices, respectively, means for independently connecting the condensers to the input circuits of the rectifying devices respectively, and means for applying the unknown voltage to the input circuits of both rectifying devices when said devices are connected to the resistors or to the condensers.

3. Apparatus for comparing the phase and magnitude of an unknown voltage with the corresponding characteristics of a known voltage of the same frequency comprising a circuit having resistive and capacitive elements upon which the known voltage is impressed, a detector, means for independently and alternately connecting the input circuit of said detector to said resistive and capacitive elements, means for continuously applying the unknown voltage on the input circuit of said detector, and a measuring device connected to the output circuit of the detector.

4. The method of comparing the phase and magnitude of an unknown voltage with the corresponding characteristics of a known voltage of the same frequency, which consists in independently applying the known voltage across resistive and capacitive elements for obtaining from the known voltage two predetermined voltages in quadrature, and separately combining each of said predetermined voltages with the unknown voltage.

5. Apparatus for comparing the phase and magnitude of an unknown voltage with the corresponding characteristics of a known voltage of the same frequency, comprising means including resistive and capacitive elements for separately deriving from the known voltage two predetermined voltages displaced 90° from each other, a detector, means for applying to the detector one of said predetermined voltages simultaneously with the unknown voltage, and means for independently applying to the detector the other of said voltages simultaneously with the unknown voltage.

ARNOLD EVERETT BOWEN.